US007422518B2

(12) United States Patent
Kotani

(10) Patent No.: US 7,422,518 B2
(45) Date of Patent: Sep. 9, 2008

(54) COIN RECEIVING AND DISPENSING DEVICE

(75) Inventor: Kazumi Kotani, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/565,959

(22) PCT Filed: Aug. 5, 2004

(86) PCT No.: PCT/JP2004/011245

§ 371 (c)(1),
(2), (4) Date: Aug. 21, 2006

(87) PCT Pub. No.: WO2005/015508

PCT Pub. Date: Feb. 17, 2005

(65) Prior Publication Data

US 2007/0060033 A1 Mar. 15, 2007

(30) Foreign Application Priority Data

Aug. 7, 2003 (JP) ............................ 2003-289273

(51) Int. Cl.
*G07D 1/00* (2006.01)
*B65G 15/60* (2006.01)
*B65G 17/30* (2006.01)

(52) U.S. Cl. ........................................ 453/56; 198/841

(58) Field of Classification Search .................. 453/56; 198/837

See application file for complete search history.

(56) References Cited

U.S. PATENT DOCUMENTS 3,741,366 A * 6/1973 Van Melle et al. .......... 198/400
5,232,398 A 8/1993 Maki
5,989,118 A * 11/1999 Chiba et al. .................. 453/11

FOREIGN PATENT DOCUMENTS

| | | | |
|---|---|---|---|
| EP | 0 831 429 | A2 | 3/1998 |
| FR | 2 508 208 | A | 12/1982 |
| GB | 2 106 296 | A | 4/1983 |
| JP | 5-2676 | A | 1/1993 |
| JP | 10-269405 | A | 10/1998 |

(Continued)

OTHER PUBLICATIONS

Supplementary European Search Report dated Mar. 6, 2008, issued in counterpart European Application.

*Primary Examiner*—Patrick Mackey
*Assistant Examiner*—Mark Beauchaine
(74) *Attorney, Agent, or Firm*—Frishauf, Holtz, Goodman & Chick, PC

(57) ABSTRACT

To ease a load to drive power for rotationally driving a coin dispensing belt even if the number of coins on the coin dispensing belt which carries the coin increases, a belt guide mechanism is provided which includes a belt guide for guiding the coin dispensing belt along a coin carrying direction, a coin contacting face which is located at both sides of the belt guide, and is located lower than a coin carrying surface, and an escape space for allowing the coin carrying surface of the coin carrying belt to be located lower than the coin contacting face when a downward bending force is applied to the coin dispensing belt.

20 Claims, 8 Drawing Sheets

FOREIGN PATENT DOCUMENTS

| | | | | |
|---|---|---|---|---|
| JP | 11-296720 | A | * | 10/1999 |
| JP | 11-296720 | A | | 10/1999 |
| JP | 2000-242844 | A | | 9/2000 |
| JP | 2002-245506 | A | | 8/2002 |
| JP | 2002-260047 | A | | 9/2002 |

* cited by examiner (a)

(b)

X-XCROSS SECTION (c)

Y-YCROSS SECTION

COIN RECEIVING AND DISPENSING DEVICE

This application is a U.S. National Phase Application under 35 USC 371 of International Application PCT/JP2004/011245 filed Aug. 5, 2004.

TECHNICAL FIELD

The present invention relates to a coin receiving and dispensing device, and more particularly, relates to a coin receiving and dispensing device which is suitable to be connected with electronics devices such as a Point Of Sales (POS) terminal or an Electronic Cash Register (ECR).

BACKGROUND ART

A coin receiving and dispensing device, which has a built-in coin holder for holding coins according to denominations, and dispenses the coins in response to a command from a POS terminal or an ECR to dispense change, has been currently widely popular. Such a coin receiving and dispensing device is, for example, disclosed at Patent Document 1.

The coin receiving and dispensing device typically has a structure such that a group of various kinds of coins received from a coin receiving inlet, which is located at a front part of the coin receiving and dispensing device, is carried to a coin sorter, which is located at a back part of the coin receiving and dispensing device. The coin sorter has sorting holes, the sizes of which are determined according to denominations. A coin is dropped into one of the sorting holes according to a denomination so as to be held in a coin holder provided under the sorting hole according to the denomination. The coin held in the coin holder according to the denomination is carried by a coin dispensing belt, and a desired number of the coin are dispensed to a coin dispensing outlet by an operation of a coin shutter, which is freely advanced and retreated with respect to a coin carrying path on the coin dispensing belt.

In more recent years, to downsize the coin receiving and dispensing device, another type of the coin receiving and dispensing device has been proposed. The coin receiving and dispensing device has a structure such that a width of the coin holder of each coin is formed substantially the same as the diameter of the coin and a width of the coin dispensing belt is narrower than the diameter of the coin. Further, to reduce the number of coin replenishments, it is desired to increase the number of coins which can be held in the coin holder.

Patent Document 1: Japanese Patent Laid-Open Publication No. 2002-245506

DISCLOSURE OF INVENTION

However, as referred to above, when the number of coins held in the coin holder increases whereas the width of the coin holder is formed substantially the same as the coin's diameter, a load to the coin dispensing belt is subject to increase. Therefore, when the load to the coin dispensing belt increases, a belt drive member for driving the coin dispensing belt is subject to a large load since the belt drive member has to rotationally drive the coin dispensing belt against a friction force between a belt guide plate and the coin dispensing belt. Especially, when a shop feeds a large amount of coins into the coin receiving and dispensing device at once in order to reduce the number of coin replenishments, this tendency is frequently noticeable.

An object of the present invention is to provide a coin receiving and dispensing device in which a load to the belt drive member for rotationally driving the coin dispensing belt does not increase even if the number of coins on the coin dispensing belt which dispenses the coins held in the coin holders to a dispensing direction increases.

A coin receiving and dispensing device, for holding a coin received from a coin receiving inlet, and for dispensing the coin to a coin dispensing outlet by denominations, includes a coin holder, for holding the coin by denominations, a width of which is formed substantially the same as a diameter of the coin, a coin dispensing belt located at a bottom part of the coin holder and driven by drive power for carrying the coin held in the coin holder toward the coin dispensing outlet by an outside coin carrying surface, a belt guide for guiding the coin dispensing belt along a coin carrying direction by controlling positions of both sides and an inside of the coin dispensing belt; a coin contacting face provided at both sides of the belt guide and located lower than the coin carrying surface, and an escape space formed at the belt guide, for allowing the coin carrying surface to be located lower than the coin contacting face when a downward bending force is applied to the coin dispensing belt.

DETAILED DESCRIPTION OF THE PREFERRED EMBODIMENTS

A preferred embodiment of the present invention will be described with reference to FIGS. 1 to 8. The coin receiving and dispensing device of the present embodiment is connected to a POS terminal (not shown), and is used with a paper money receiving and dispensing device and a money drawer, and so on.

Figure 1:
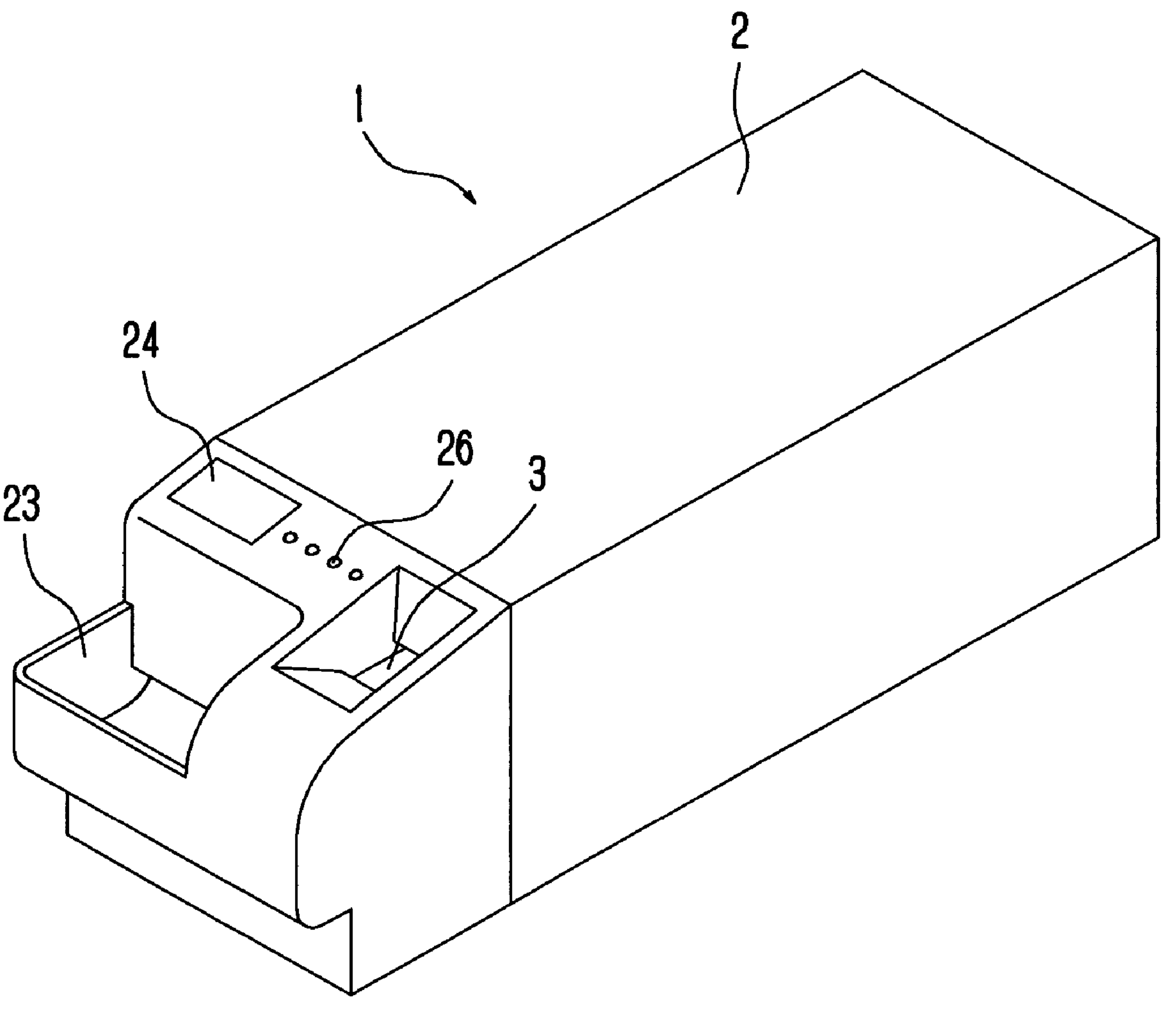
FIG. 1 is a perspective view showing an appearance of a coin receiving and dispensing device of an embodiment of the present invention.

FIG. 1 is a perspective view showing an appearance of the coin receiving and dispensing device 1. As shown in FIG. 1, a right front part of a housing 2 of the coin receiving and dispensing device 1 has a coin receiving inlet 3 opening upward for receiving coins in a group. A left front part of the housing 2 has a coin dispensing outlet 23 opening upward and displaced to the left. A display 24 and various operation keys 26 are provided at an upper part of the coin dispensing outlet 23.

Figure 2:
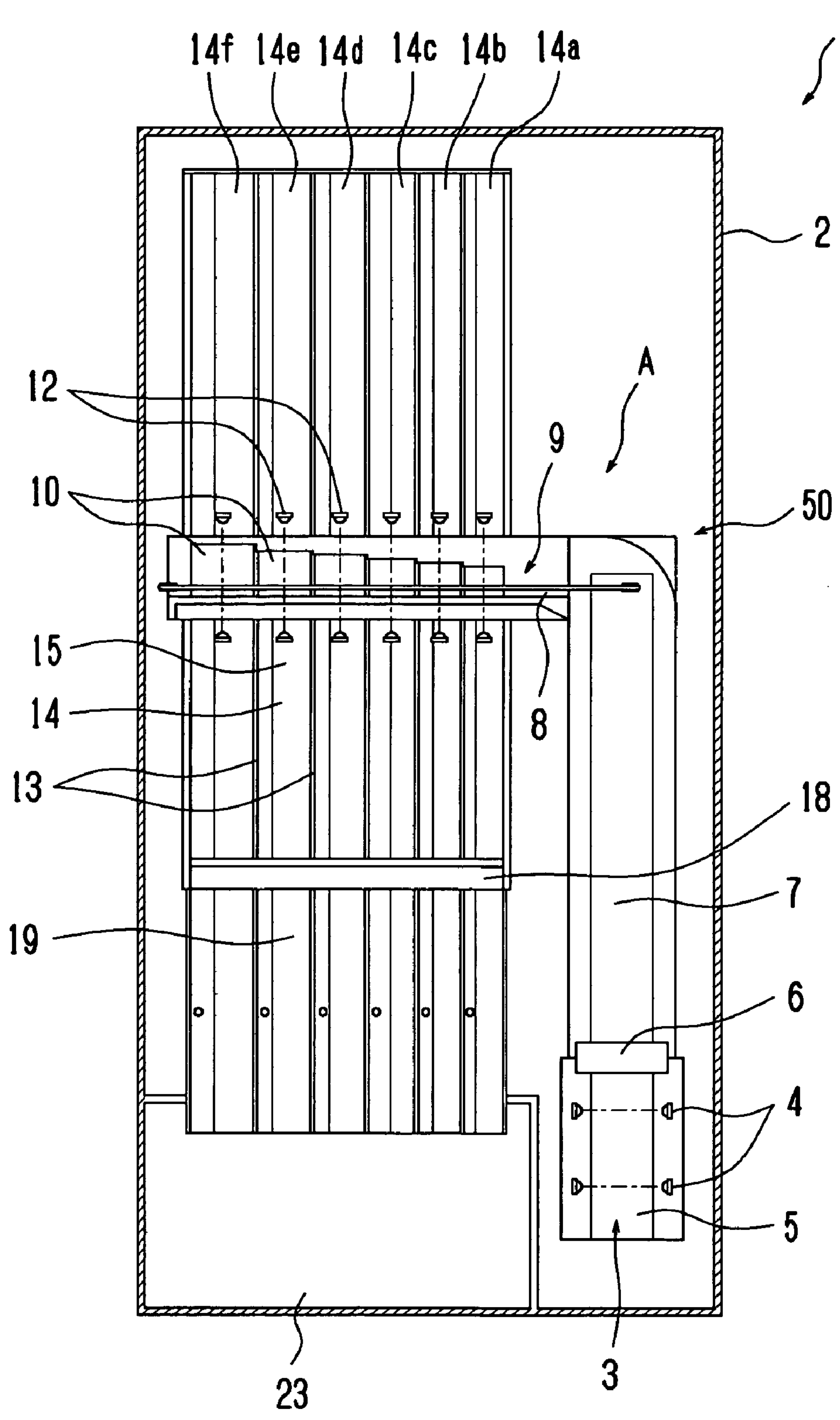
FIG. 2 is a plane view showing an inner structure of the coin receiving and dispensing device.

FIG. 2 is a plane view showing an inner structure of the coin receiving and dispensing device 1. A coin dispensing mechanism A is included in the housing 2. The coin dispensing mechanism A will be described hereinafter.

The coin receiving inlet 3 includes a plurality of inlet sensors 4 for detecting a coin photoelectrically. An inlet belt 5 is provided at the coin receiving inlet 3, which is connected to a motor M (see FIG. 7) as a drive power to be driven to carry the received coin backward. An inlet roller 6 is provided on the inlet belt 5, which is located at an end of the coin receiving inlet 3 so as to carry the randomly received coins one by one backward. A carrying belt 7, which is connected to a motor M (see FIG. 7), is connected with the inlet belt 5, for carrying each coin with a certain spacing by accelerating a coin carrying speed. Further, a coin guide 50 for bending a carrying direction at an approximate right angle, and a carrying mechanism 8, which is provided almost parallel with the width direction of the coin receiving and dispensing device 1, for carrying a coin C, the carrying direction of which is bent orthogonally by the coin guide 50 toward a coin sorting position (a coin sorter 11 described later) are provided at an end part of the carrying belt 7.

Consequently, the inlet belt 5, the inlet roller 6, the carrying belt 7, the coin guide 50 and the carrying mechanism 8 make up a coin carrying path to constitute a coin carrier 9 for carrying the coins received by the coin receiving inlet 3 toward the coin sorting position.

Below the carrying mechanism 8, sorting holes 10 increasing in width along the carrying mechanism 8 according to denominations are provided to make up a coin sorter 11 for sorting the carried coins according to denominations. As shown in FIG. 2, six sorting holes 10, sizes of which increase from right to left, are provided. Taking Japanese coins as an example, the diameters of the coins become bigger in order of 1 yen, 50 yen, 5 yen, 100 yen, 10 yen, and 500 yen. Thus, the sorting holes 10 increase in width corresponding coins' diameters in order of 1 yen, 50 yen, 5 yen, 100 yen, 10 yen, and 500 yen. Each sorting hole 10 has a counting sensor 12 for counting the number of coins according to denominations. Each sorting hole 10 is communicated with a coin holder 14 (14*a* to 14*f*) opening upward. The coin holders 14 (14*a* to 14*f*) are made of plate-shaped members on which holes increasing in size according to denominations are formed, and are divided by partitions 13 by denominations. The coin receiving and dispensing device 1 of the present embodiment realizes downsizing of the device 1 by narrowing the width of each coin holder 14 (14*a* through 14*f*). Thus, the sorting holes 10 provided above the coin holders 14*a* through 14*f* are necessarily provided closely to each other.

Figure 3:
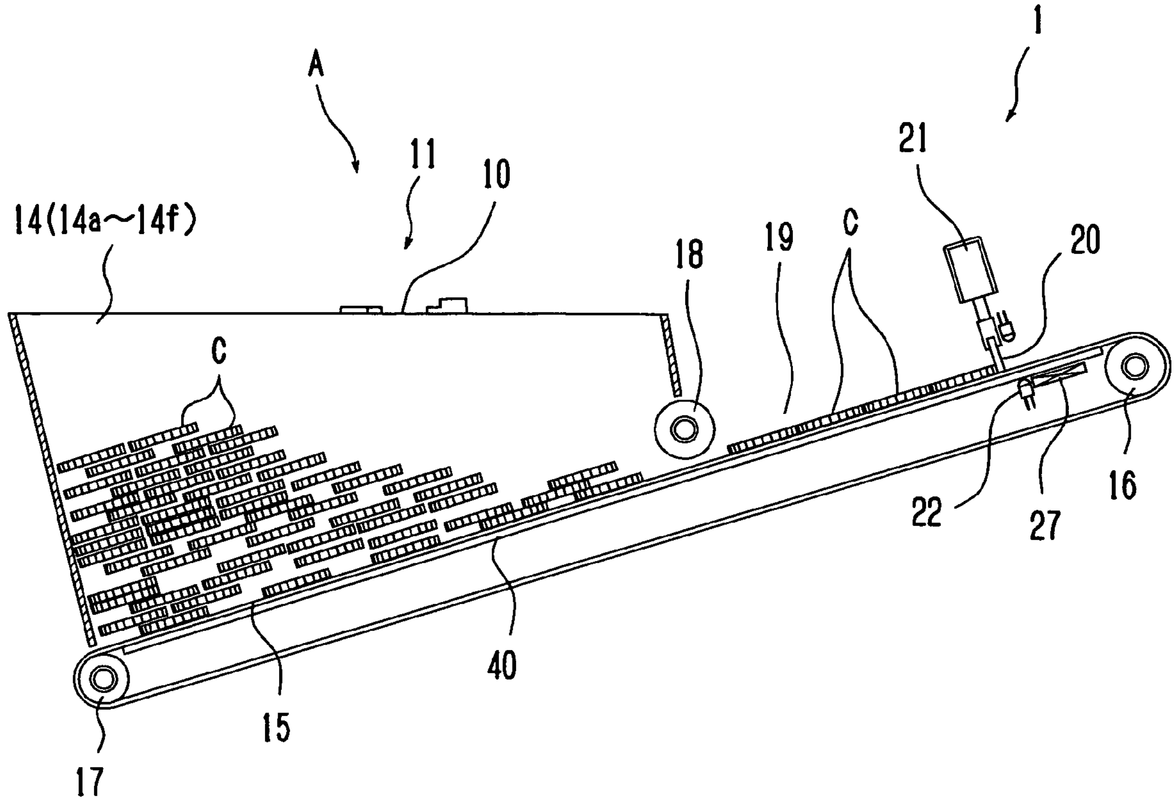
FIG. 3 is a cross-sectional view showing an inner structure of the coin receiving and dispensing device.

FIG. 3 is a cross sectional view showing an inner structure of the coin receiving and dispensing device 1. The coin holder 14 and a coin waiting position 19, and so on will be described. As shown in FIG. 3, below a bottom part of each coin holder 14, a coin dispensing belt 15, which is an endless form, and is connected to be driven by a motor M as drive power, is stretched between a driving roller 16 and a driven roller 17. That is, the motor M pulls and rotates the coin dispensing belt 15 by rotationally driving the driving roller 16 which is located downstream in the coin carrying direction. At an exit part of the coin holder 14, a separating roller 18 for separating the coins one by one is arranged having a space between the coin dispensing belt 15 and itself such that only one piece of coin can be passed through therebetween, and is also arranged to be across the exit part of all the denominations.

A width of the bottom part of the coin holders 14*a* through 14*f* is set to be wider than a diameter of a coin C which is held in one of the coin holders 14*a* through 14*f*, and is set to be narrower than a length of the diameter of the coin C plus a thickness of the coin C. The sizes as described above are determined in order to prevent a jam of the coins C. The sizes prevent an upright coin C from being stuck into a gap between the coins C held in the coin holders 14*a* through 14*f* parallel with the coin dispensing belt 15, and the partitions 13 arranged to divide the coin holders 14*a* through 14*f* by denominations.

Further, as shown in FIG. 3, a belt guide plate 40 is provided within an inner side of the coin dispensing belt 15, and the belt guide plate 40 and the coin dispensing belt 15 are inclined to form an uprising slope toward the downstream of the coin carrying direction.

The coin waiting position 19 for keeping a certain number of coins in one line is provided by denominations more downstream than the separating roller 18 in the coin carrying direction. The coin waiting position 19 includes the coin dispensing belt 15 so as to function as a coin dispensing path as well.

A coin shutter 20 is provided at each coin waiting position 19. The coin shutter 20 is connected with a shutter solenoid 21 to be movable forward and backward in relation to the coin dispensing belt 15. The shutter solenoid 21 controls the coin shutters 20 to selectively function either to stop the coins temporarily by denominations, or to carry a necessary number of coins.

Right after the coin shutter 20, a dispensing sensor 22 as an optical sensor for counting the number of the paid out coins by denominations, and a material sensor 27 of an oscillation coil for detecting a material of the coins, are provided.

Figure 4:
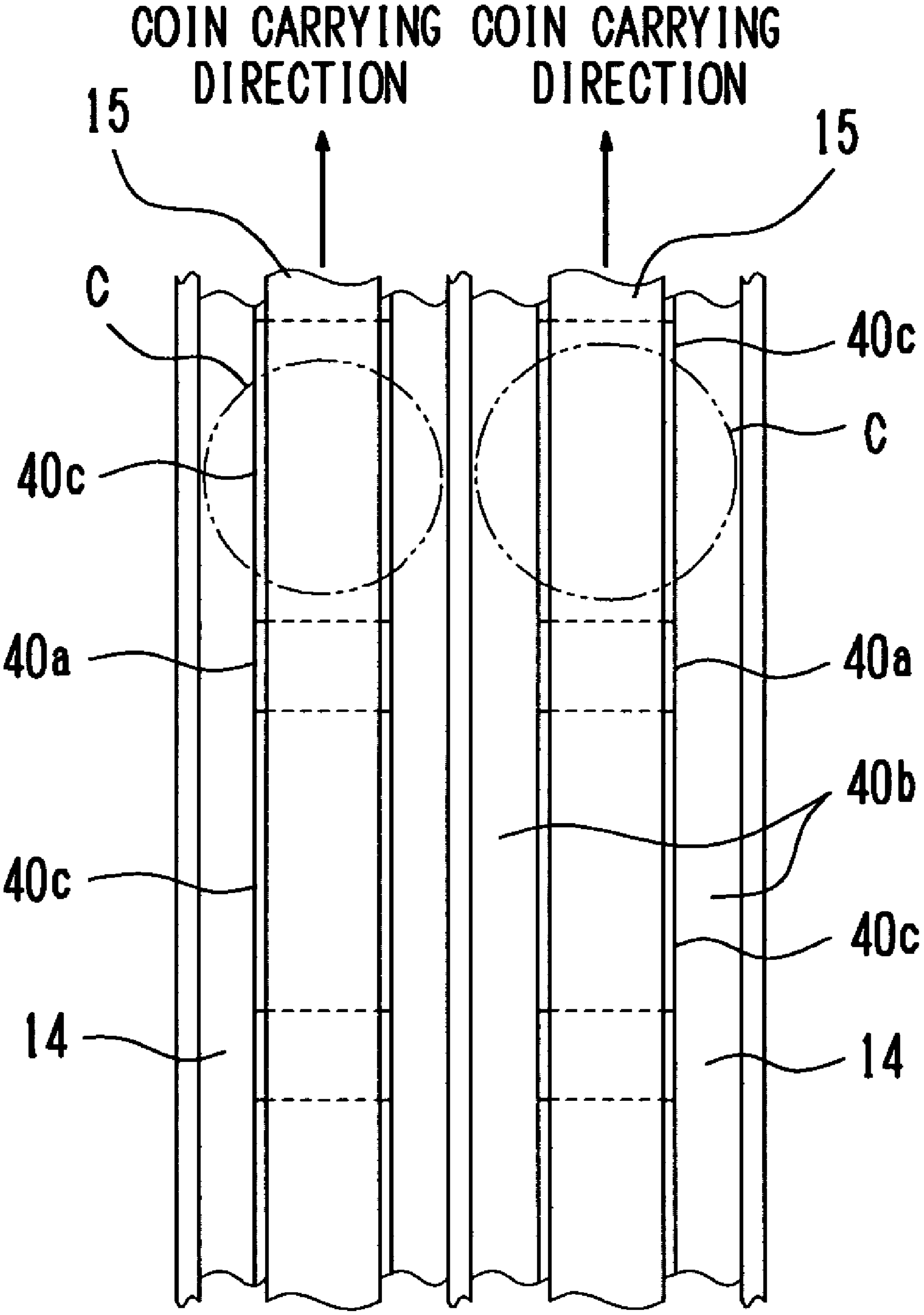
FIG. 4 is a plane view partially showing a coin holder.

FIG. 4 is a plane view partially showing the coin holder 14. The belt guide plate 40 will be precisely described. As shown in FIG. 4, a concave belt guide 40*a* for guiding the coin dispensing belt 15 is formed at an approximate center of the coin holder 14 along the coin carrying direction. That is, the coin dispensing belt 15 is formed to be narrower in width than the diameter of the coin C which is held in the coin holder 14. At the belt guide plate 40, a coin contacting face 40*b* positioned at both sides of the belt guide 40*a* and positioned lower than the coin carrying surface of the coin dispensing belt 15 which is guided on the belt guide 40*a* is formed flat. Also, at the belt guide 40*a* positioned more upstream in the coin carrying direction than the separating roller 18, a concave escape space 40*c* is provided for allowing the coin carrying surface of the coin dispensing belt 15 on which the coins C are piled up to escape into a lower position than the coin contacting face 40*b*.

Figure 5:
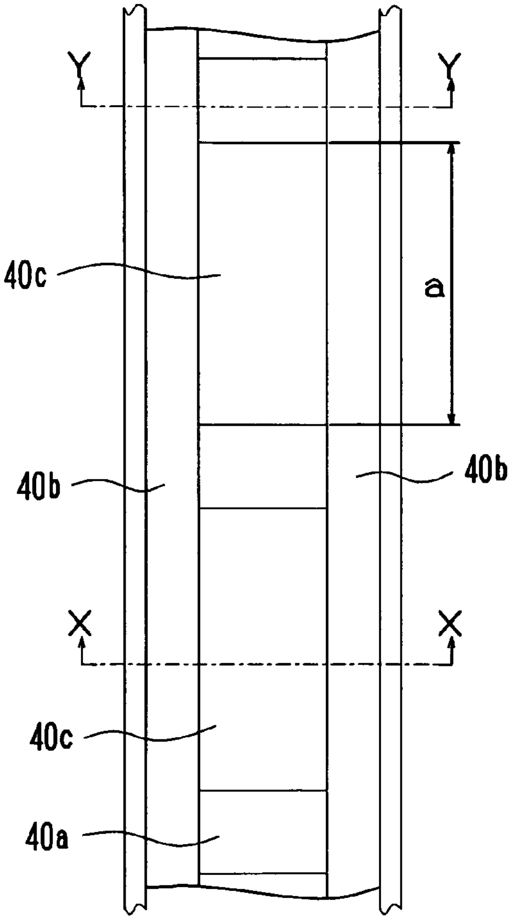
FIG. 5 is a plane view partially showing a belt guide plate.
Figure 5:
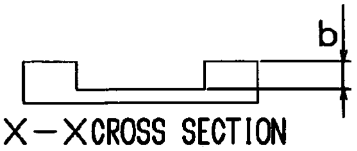
Figure 5:
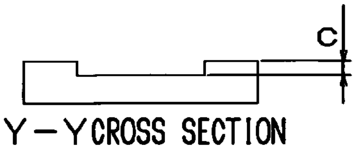

FIG. 5 is a plane view partially showing the belt guide plate 40. The escape space 40*c* will be described. As shown in FIG. 5, a length a of the escape space 40*c* in the coin carrying direction is at least a length of "the diameter of the coin C+(the thickness of the coin dispensing belt 15×(times) 2)". Further, a depth b of the escape space 40*c* is at least deeper than "the thickness of the coin dispensing belt 15". Here, a depth c of the belt guide 40*a* where the escape space 40*c* is not formed thereon is shallower than "the thickness of the coin dispensing belt 15".

Figure 6:
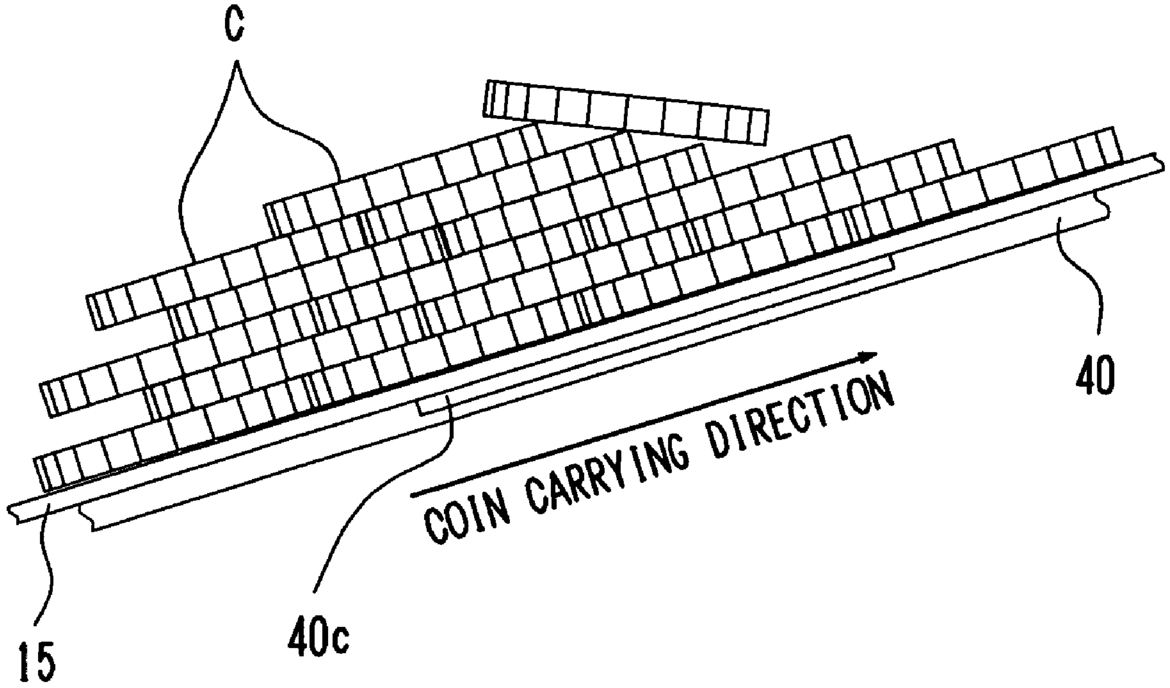
FIG. 6 is an illustrative view showing an avoidance of a friction force between the belt guide plate and a coin dispensing belt at an escape space.

FIG. 6 is an illustrative view showing an avoidance of a friction force between the belt guide plate 40 and the coin dispensing belt 15 at the escape space 40*c*. The reason why the escape space 40*c* is provided at the belt guide 40*a* will be explained. The coin dispensing belt 15 is, as described above, pulled and rotated in accordance with rotary drive of the driving roller 16, which is located downstream in the coin carrying direction. That is, when the number of the coins C held in the coin holders 14*a* through 14*f* is small, the coins C can be carried apart from the belt guide plate 40 by tension of the coin dispensing belt 15. However, in the coin receiving and dispensing device 1 of the present embodiment, the width of the bottom part of the coin holders 14*a* through 14*f* is set to be wider than the diameter of the coin C held in the coin holders 14*a* through 14*f*, and the width is narrower than the length of the diameter of the coin C plus the thickness of the coin C. Thus, a load to the coin dispensing belt 15 tends to increase in proportion to the number of the coins C held in the coin holders 14*a* through 14*f*. When the load to the coin dispensing belt 15 increases, the motor M has to rotationally drive the coin dispensing belt 15 against a weight of the coins C, and a friction power between the coin dispensing belt 15 and the belt guide plate 40. As a result, the motor M suffers tremendous load. Especially, when a shop feeds a large amount of coins into the coin receiving and dispensing device 1 at once in order to reduce the number of coin replenishments, this tendency is frequently noticeable. As a consequence, the escape space 40*c* is provided to allow the coin carrying surface of the coin dispensing belt 15 to be positioned lower than the coin contacting face 40*b* when the coins C are carried on the belt guide 40*a*. This allows the weight of the coins C to be loaded on the coin contacting face 40*b* so that the occurrence of the friction force between the belt guide plate 40 and the coin dispensing belt 15 at the escape space 40*c* can be prevented. As a result, it is possible not to increase the load to the motor M.

Figure 7:
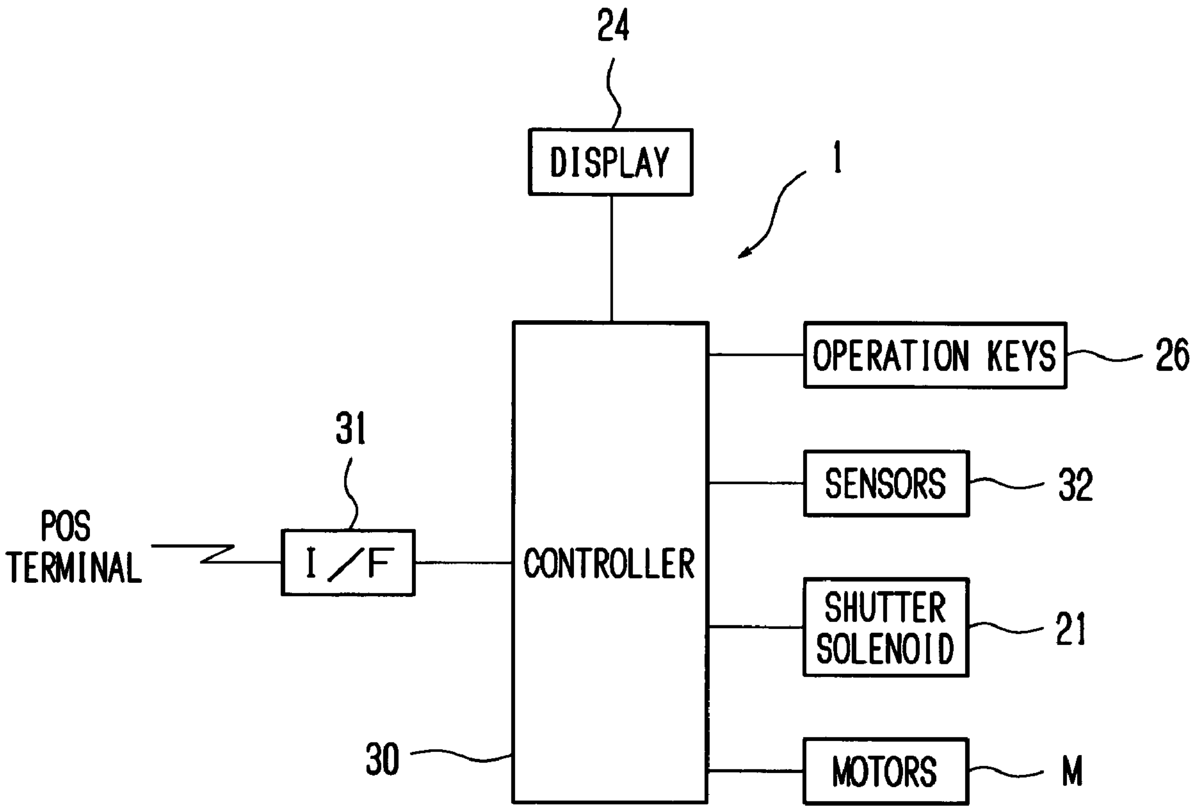
FIG. 7 is a block diagram showing an electric connection of each part included in the coin receiving and dispensing device.

FIG. 7 is a block diagram showing an electric connection of each part stored in the coin receiving and dispensing device 1. The electric connection of each part stored in the coin receiving and dispensing device 1 will be described with reference to FIG. 7. The coin receiving and dispensing device 1 has a controller 30 for controlling each part, which is connected to a POS terminal through an interface (I/F). The controller 30 comprises, not shown particularly, a CPU (Central Processing Unit) for controlling each part intensively, a ROM (Read Only Memory) for storing fixed data in advance such as controlling program and so on, a RAM (Random Access Memory) for rewritably storing changeable data such as the number of the coins C by denominations, and so on. Further, the controller 30 is connected to the display 24 and the operation keys 26.

The controller 30 is connected to various sensors 32 such as the inlet sensor 4, the counting sensor 12, the dispensing sensor 22, the material sensor 27, and so on, the shutter solenoid 21, each motor M, and so on. Here, the various sensors 32 such as the inlet sensor 4, the counting sensor 12, the dispensing sensor 22, the material sensor 27, and so on detect a fluctuation of a voltage of the coil, or a signal of an optically detected coin C, and transmit them to the controller 30. Then, the controller 30 drives and controls each motor M based on the detected signal. Then, the shutter solenoid 21 is driven and controlled based on the output signal from the controller 30 to turn on electricity (ON), and retrieve the coin shutter 20 from the coin dispensing belt 15 and drives out a specified number of the coins C. In the present embodiment, only one shutter solenoid 21 is shown. However, in practice, the controller 30 controls each shutter solenoid 21 corresponding to each denomination.

According to the structure described above, when the coin C is dropped into the coin receiving inlet 3, the inlet sensor 4 detects the coin C, and in accordance with the detected signal, the inlet belt 5, the inlet roller 6, the carrying belt 7, and the carrying mechanism 8 are driven. Then, the coin C received by the coin received inlet 3 is separated and carried one by one between the inlet belt 5 and the inlet roller 6. Then, the carrying direction of the coin C on the carrying belt 7 is bent at an approximate right angle, and the coin C is transferred from the carrying belt 7 to the carrying mechanism 8, and is sorted out by denominations at the coin sorter 11. The coin C is dropped into one of the sorting holes 10 by the denomination, and held in one of the coin holders 14*a* through 14*f* by the denomination. Then, the number of coins C dropped into the sorting holes 10 is counted by the counting sensor 12.

Further, when there are no coins C in the coin waiting position 19, the coin dispensing belt 15 is controlled to carry a predetermined number of the coins C to the coin waiting position 19.

Then, a transaction process is performed at the POS terminal. When a dispensing command is given, the coin dispensing belt 15 is driven whereas the coin shutters 20 by denomination are driven by the shutter solenoid 21 so that a necessary number of the coins C are dispensed out. The dispensed coins C are paid out to a coin dispensing outlet 23.

According to the present embodiment, when the number of coins C held in the coin holder 14 is small, the coins C are carried apart from the belt guide plate 40 by the tension of the coin dispensing belt 15. Since the widths of the coin holders 14 are formed substantially the same as the coin C's diameters, the load to the coin dispensing belt 15 tends to increase in proportion to the number of coins C held in the coin holder 14. Therefore, when the load to the coin dispensing belt 15 increases, the motor M has to rotationally drive the coin dispensing belt 15 against the weight of the coins C, and the friction force between the belt guide plate 40 and the coin dispensing belt 15. As a result, a tremendous load is applied to the motor M. As a consequence, the escape space 40*c* is provided to allow the coin carrying surface of the coin dispensing belt 15 to be positioned lower than the coin contacting face 40*b* when the coins C are carried on the belt guide 40*a*. The weight of the coins C can be loaded on the coin contacting face 40*b* so that the occurrence of the friction force between the belt guide plate 40 and the coin dispensing belt 15 at the escape space 40*c* can be avoided. Consequently, even if a large amount of coins C, which are held in the coin holder 14, the width of which is formed to be substantially the same as the coin C's diameter, are carried and dispensed out on the coin dispensing belt 15, the load to the motor M for rotationally driving the coin dispensing belt 15 is not increased.

Since the load to the motor M which drives and controls the coin dispensing belt 15 does not increase, electric power to the motor M can be saved. That is, the coin receiving and dispensing device 1 of the present embodiment may enjoy the benefit of less power consumption.

Figure 8:
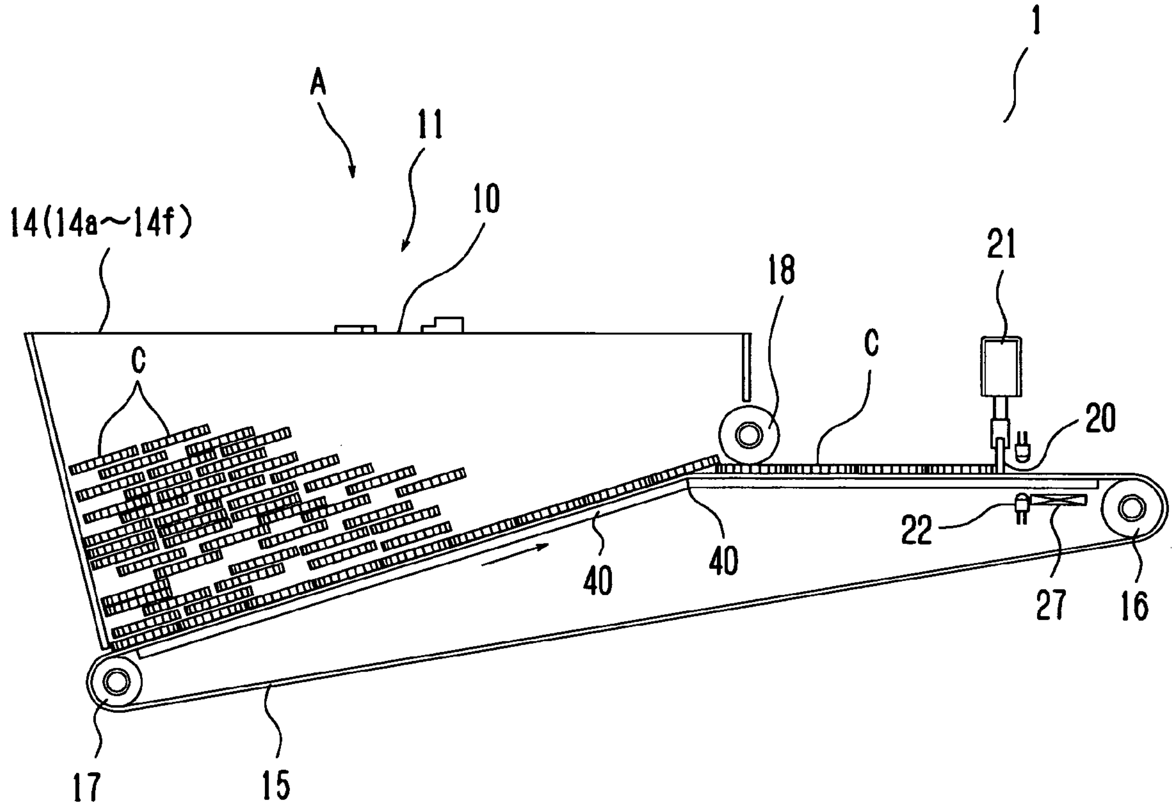
FIG. 8 is a cross-sectional view showing another example of the belt guide plate.

FIG. 8 is a cross sectional view showing another example of the belt guide plate 40. The belt guide plate 40 of the previous embodiment is inclined to form an uprising slope toward the downstream of the coin carrying direction, but it is not limited to the example. For example, as shown in FIG. 8, a crooked belt guide plate 40 having a crooked portion 41 can be used. With this crooked belt guide plate 40, a first carrying path which forms an uprising slope between the driven roller 17 and the crooked portion 41, and an approximately horizontal second carrying path between the crooked portion 41 and the driving roller 16 are formed. With this crooked belt guide plate 40, the coins C in the coin holder 14 can be readily mixed up. Here, to form the escape space 40*c* at the belt guide plate 40, the escape space 40*c* needs to be located upstream of the separating roller 18 in the carrying direction.

INDUSTRIAL APPLICABILITY

In the area of retail business, the present invention is useful when the coin receiving and dispensing device is communicated with a POS terminal, or as a stand alone to receive or dispense coins automatically at a settlement.

The invention claimed is:

1. A coin receiving and dispensing device, for holding a coin received from a coin receiving inlet, and for dispensing the coin to a coin dispensing outlet in accordance with a denomination of the coin, the device comprising:

a coin holder, for holding coins of a same denomination, which holds the coin and which has a width that is substantially the same as a diameter of the coin;

a coin dispensing belt which is located at a bottom part of the coin holder, and which is driven to carry the coin held in the coin holder toward the coin dispensing outlet, said coin dispensing belt comprising an endless belt having a coin carrying surface on which the coin is carried at an outer surface thereof, an inner surface which is opposite to the outer surface, and two lateral sides;

a belt guide for guiding the coin dispensing belt along a coin carrying direction by controlling positions of the two sides and the inner surface of the coin dispensing belt;

a pair of coin contacting faces which are provided at opposite sides of the coin dispensing belt with respect to each other, so as to be capable of supporting the coin, and which are positioned lower than the coin carrying surface of the coin dispensing belt; and an escape space formed on the belt guide, for allowing the coin carrying surface of the coin carrying belt to be positioned lower than the coin contacting faces when a downward bending force is applied to the coin dispensing belt.

2. The coin receiving and dispensing device according to claim 1, wherein the escape space is formed in a concave shape.

3. The coin receiving and dispensing device according to claim 1, wherein a length of the escape space in the coin carrying direction is longer than a sum of the diameter of the coin and two times a thickness of the coin dispensing belt.

4. The coin receiving and dispensing device according to claim 1, wherein the belt guide is located at a center part of the coin holder.

5. The coin receiving and dispensing device according to claim 1, wherein the coin contacting faces are flat.

6. The coin receiving and dispensing device according to claim 1, wherein the belt guide and the coin contacting faces are integrally formed.

7. The coin receiving and dispensing device according to claim 1, wherein the inner surface of the carrying belt is flat.

8. The coin receiving and dispensing device according to claim 1, wherein a downstream end of the coin dispensing belt in the coin carrying direction side is positioned higher than an upstream end of the coin dispensing belt in the coin carrying direction.

9. The coin receiving and dispensing device according to claim 7, wherein the coin holder comprises a sorting hole at an upper part thereof for sorting the coin to be held in the coin holder in accordance with the denomination of the coin.

10. The coin receiving and dispensing device according to claim 7, wherein the coin holder comprises a separating roller at an exit thereof for separating coins held in the coin holder into individual coins.

11. The coin receiving and dispensing device according to claim 1, wherein the coin holder comprises a sorting hole at an upper part thereof for sorting the coin to be held in the coin holder in accordance with the denomination of the coin.

12. The coin receiving and dispensing device according to claim 1, wherein the coin holder comprises a separating roller at an exit thereof for separating coins held in the coin holder into individual coins.

13. The coin receiving and dispensing device according to claim 1, wherein the width of the coin holder is greater than the diameter of the coin and less than a sum of the diameter of the coin and a thickness of the coin.

14. A coin receiving and dispensing device, for holding a coin received from a coin receiving inlet, and for dispensing the coin to a coin dispensing outlet in accordance with a denomination of the coin, the device comprising:

a coin holder, for holding coins of a same denomination, which holds the coin and which has a width that is substantially the same as a diameter of the coin;

a coin dispensing belt which is located at a bottom part of the coin holder, and which is driven to carry the coin held in the coin holder toward the coin dispensing outlet, said coin dispensing belt comprising an endless belt having a coin carrying surface on which the coin is carried at an outer surface thereof, an inner surface which is opposite to the outer surface, and two lateral sides;

a pair of coin contacting faces which are provided at opposite sides of the coin dispensing belt with respect to each other, so as to be capable of supporting the coin, and which are positioned lower than the coin carrying surface of the coin dispensing belt; and a belt guide, which is provided under the inner surface of the coin dispensing belt and which guides the coin dispensing belt along a coin carrying direction;

wherein the belt guide comprises: (i) at least one shallow portion which prevents the coin carrying surface of the coin dispensing belt from being positioned lower than the coin contacting faces when a bending force is applied to the coin carrying surface over the shallow portion, and (ii) at least one escape space which permits the coin carrying surface of the coin dispensing belt to be positioned lower than the coin contacting faces, such that the coin contacting faces support the coin on the coin dispensing belt over the escape space, when a bending force is applied to the coin carrying surface over the escape space.

15. The coin receiving and dispensing device according to claim 14, wherein at each said shallow portion of the belt guide, a depth from the coin contacting faces to a surface of the belt guide at the shallow portion is less than a thickness of the coin dispensing belt.

16. The coin receiving and dispensing device according to claim 15, wherein at each said escape space of the belt guide, a depth from the coin contacting faces to the surface of the belt guide at the escape space is greater than the thickness of the coin dispensing belt.

17. The coin receiving and dispensing device according to claim 14, wherein a length of each said escape space in the coin carrying direction is longer than a sum of the diameter of the coin and two times a thickness of the coin dispensing belt.

18. The coin receiving and dispensing device according to claim 14, wherein the width of the coin holder is greater than the diameter of the coin and less than a sum of the diameter of the coin and a thickness of the coin.

19. A coin receiving and dispensing device, for holding a coin received from a coin receiving inlet, and for dispensing the coin to a coin dispensing outlet in accordance with a denomination of the coin, the device comprising:

a coin holder, for holding coins of a same denomination, which holds the coin and which has a width that is substantially the same as a diameter of the coin;

a coin dispensing belt which is located at a bottom part of the coin holder, and which is driven to carry the coin held in the coin holder toward the coin dispensing outlet, said coin dispensing belt comprising an endless belt having a coin carrying surface on which the coin is carried at an outer surface thereof, an inner surface which is opposite to the outer surface, and two lateral sides;

a pair of coin contacting faces which are provided at opposite sides of the coin dispensing belt with respect to each other, and which are positioned lower than the coin carrying surface of the coin dispensing belt; and a belt guide which guides the coin dispensing belt along a coin carrying direction, and which is positioned below the inner surface of the coin dispensing belt and lower than the coin contacting faces;

wherein the belt guide comprises: (i) at least one shallow portion positioned such that a depth from the coin contacting faces to a surface of the belt guide at the shallow portion is less than a thickness of the coin dispensing belt, and (ii) at least one escape space positioned such that a depth from the coin contacting faces to a surface of the belt guide at the escape space is greater than a thickness of the coin dispensing belt.

20. The coin receiving and dispensing device according to claim 19, wherein a length of each said escape space in the coin carrying direction is longer than a sum of the diameter of the coin and two times a thickness of the coin dispensing belt.

* * * * *